(No Model.)

S. TOOMEY.
SULKY.

No. 499,860.　　　　　Patented June 20, 1893.

Witnesses　　　　　　　　　Inventor
Ed G. Lane　　　　　　　　Samuel Toomey
Chas. R. Miller　　　　　　B. W. B. Miller
　　　　　　　　　　　　　Attorney

United States Patent Office.

SAMUEL TOOMEY, OF CANAL DOVER, OHIO.

SULKY.

SPECIFICATION forming part of Letters Patent No. 499,860, dated June 20, 1893.

Application filed October 15, 1892. Serial No. 449,031. (No model.)

*To all whom it may concern:*

Be it known that I, SAMUEL TOOMEY, a citizen of the United States, and a resident of Canal Dover, county of Tuscarawas, State of Ohio, have invented a new and useful Improvement in Sulkies, of which the following is a full, clear, and exact description, reference being had to the accompanying drawings, making part of this specification.

My invention relates to improvements in sulkies, the object of which is to provide means by which a wheel of greatly reduced diameter may be used on a sulky gear or body, constructed originally for a wheel of a greater diameter, and consists in providing a trussed extension of the axle, to a point below the spindle provided originally for the large or wheel of greater diameter.

With these ends in view my invention relates to certain features of construction and combination of parts as will be hereinafter described and pointed out in the claims.

Figure 1:
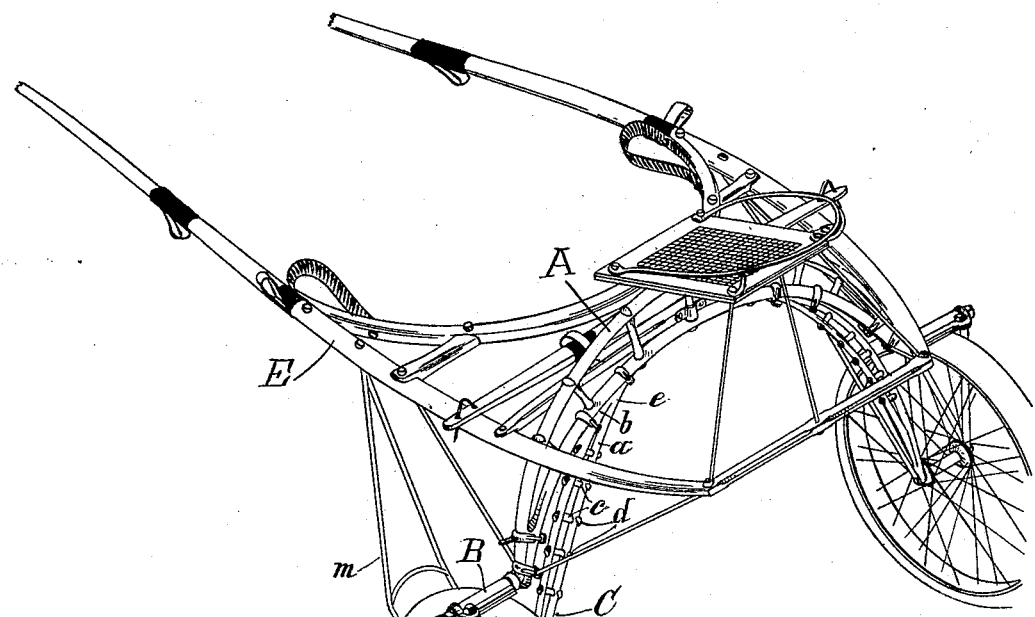
Figure 2:
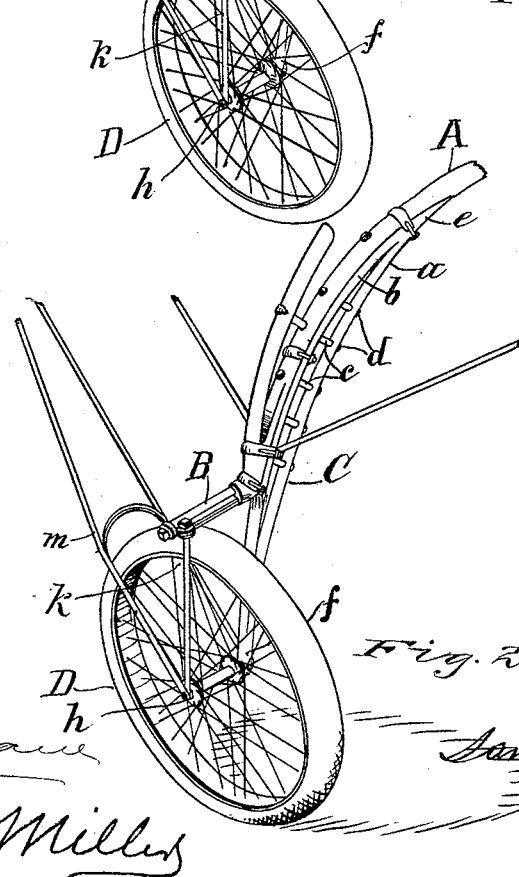

Figure 1, of the accompanying drawings is a view in perspective of a sulky illustrating my invention. Fig. 2, is a similar view of a portion of the sulky.

Similar letters of reference indicate corresponding parts in both figures of the drawings.

A, represents a curved axle having at its end portions, spindles B, all of which are of a well known and approved form as originally constructed for a high wheeled sulky. To adapt this axle to use a wheel the rim of which shall be below the spindle B, I have provided an extension truss C, formed of members $a$ and $b$, of unequal curvature, the end portions of which are secured together, the middle portions spaced apart and secured in position by spools or sleeves $c$, and the through bolts $d$. The upper end $e$ of the truss C, is secured to the axle, the lower end $f$ projecting a distance below the spindle B; at the lower end portion $f$ is provided an aperture in which is placed the spindle $h$, for the wheel D, and from the outer end of the spindle B, is downwardly projected, a support $k$, adapted at its lower end to receive and support the outer end of the spindle $h$, and from the ends of the spindle $h$ to the shafts E, is extended a draft cord and fender $m$. If preferred, the truss C may be disconnected from the lower end of the axle A, as shown in Fig. 1, in which position the portion C, takes the position of a truss brace. In either form the space under the axle and between the wheels is open and free from obstruction to the movement of the horse.

Having thus fully described the nature and the object of my invention, what I claim, and desire to secure by Letters Patent, is—

1. The combination in a sulky of the axle A, and spindle B, of the truss extension C, substantially as described and for the purpose set forth.

2. The combination in a sulky of the axle A, and spindle B, of a truss brace C, secured to said axle and projected therefrom to a point a distance below the spindle B, a support $k$, secured to the spindles B and $h$, and the draft and fender cord $m$, substantially as described and for the purpose set forth.

In testimony whereof I have hereunto set my hand this 1st day of September, A. D. 1892.

SAMUEL TOOMEY.

Witnesses:
 W. K. MILLER,
 CHAS. R. MILLER.